United States Patent [19]

Rae-Smith

[11] Patent Number: 5,557,713
[45] Date of Patent: Sep. 17, 1996

[54] IMPROVEMENTS IN OR RELATING TO ELECTRONIC GRAPHIC SYSTEMS

[75] Inventor: Adam Rae-Smith, Newbury, England

[73] Assignee: Quantel Limited, Newbury, England

[21] Appl. No.: 440,885

[22] Filed: May 15, 1995

Related U.S. Application Data

[63] Continuation of Ser. No. 961,291, Oct. 15, 1992, abandoned.

[30] Foreign Application Priority Data

Oct. 18, 1991 [GB] United Kingdom ............... 9122209

[51] Int. Cl.$^6$ .................................................. G06F 15/72
[52] U.S. Cl. ........................................................ 395/135
[58] Field of Search ...................................... 395/138, 142, 395/143, 136, 179, 180, 181, 135, 133

[56] References Cited

U.S. PATENT DOCUMENTS

| | | | |
|---|---|---|---|
| 3,576,574 | 4/1971 | Baskin et al. | 340/324 |
| 3,659,281 | 4/1972 | Mori | 340/324 A |
| 4,212,009 | 7/1980 | Adleman et al. | 340/728 |
| 4,486,785 | 12/1984 | Lasher et al. | 358/284 |
| 4,591,844 | 5/1986 | Hickin et al. | 340/728 |
| 4,849,910 | 7/1989 | Jacobs et al. | 364/519 |
| 4,918,530 | 4/1990 | Barton et al. | 358/183 |
| 4,974,083 | 11/1990 | Bloomfield | 358/160 |

FOREIGN PATENT DOCUMENTS

| | | | |
|---|---|---|---|
| 0202747 | 11/1986 | European Pat. Off. | G06F 15/72 |
| 0462789 | 12/1991 | European Pat. Off. | H04N 5/265 |
| 2247386 | 2/1992 | United Kingdom | G06F 15/72 |

*Primary Examiner*—Phu K. Nguyen
*Attorney, Agent, or Firm*—Cooper & Dunham LLP

[57] ABSTRACT

Features in an image being modified can be expanded or contracted under the control of the user. The expansion and contraction are both executed by offsetting image data and then writing the offset data to a store where it is combined by a weighted summation with data previously stored therein. This operation is repeated for different offsets. The effect of the weighted summation is also to add soft edges to features in the picture and the system may therefore be used to soften control images.

17 Claims, 2 Drawing Sheets

IMPROVEMENTS IN OR RELATING TO ELECTRONIC GRAPHIC SYSTEMS

This is a continuation of application Ser. No. 07/961,291 filed Oct. 15, 1992 abandoned.

The invention relates to electronic graphic systems.

Electronic graphic or image systems in which the painting or drawing of a colour picture can be achieved by electronic means are known. One such system is included in our electronic graphic equipment sold under the trademark "PAINTBOX" and described in our British Patent No. 2,098,625 and corresponding U.S. Pat. No. 4,514,818, the teachings of which are incorporated herein by reference. This equipment includes user operable means, in the form of a stylus and touch tablet and a menu of facilities displayed on a display monitor, by which the user can select from a range of colours and a range of notional drawing implements for use in painting or drawing a picture.

The stylus and touch tablet combination includes means for generating position signals representing the position of the stylus on the touch tablet. When such a position signal is produced new picture elements (pixels) are derived for every element in a patch covered by the user selected drawing implement. A picture store is provided and each new pixel is written at the appropriate picture point in the store. The equipment also includes a processing circuit which derives the new pixels in accordance with the distribution of the selected implement, the colour selected by the user and the value of each pixel previously stored at the respective location in the store and also, as described in the above mentioned patents, in response to pressure applied to the stylus by the user. The user paints or draws by choosing a desired colour and implement, and then manipulating the stylus on the touch tablet and thereby causing the touch tablet to generate a series of position signals defining the path or position of the stylus. The processing circuit derives pixels for a patch of points in the picture and these derived pixels are written back to the picture store. To enable the user to observe the picture being created, the store is read repeatedly and the pixels are applied to a TV-type colour monitor, thus enabling the build-up of the picture to be observed.

Another system which includes additional means to enable a user to perform picture composition in addition to painting is described in our British Patent No. 2,113,950 and corresponding U.S. Pat. No. 4,602,286 the teachings of which are also incorporated herein. In this system, storage means are provided for storing two independent pictures which are combined under the users control by way of a control image or stencil held in a stencil store. A picture is produced by drawing pixels into the stencil store and using these pixels as an interpolation coefficient to control the combining of the two independent pictures.

Our PAINTBOX electronic graphics equipment includes two functions, known as "outline" and "surround", by which an outline or surround can be added to features in a picture. Data representing a selected feature is held in a first store at storage locations corresponding to the position of the feature in the image. When the "outline" or "surround" function is selected, the feature data is read from the first store to respective locations in a second store. The data is then written to the second store several times, each time being offset by one storage location, i.e. one pixel in the image, in a different direction. The original feature data in the first store is then subtracted from the data at respective locations in the second store. In this way a line of pixels one pixel wide is created corresponding to the outline of the selected feature. If the user has selected the "outline" function then the outline data in the second store is used to replace the feature data in the store and if "surround" is selected the outline data in the second store is added to data in the first store to create data representing an image in which the selected feature is surrounded by an outline.

The build-up of the picture should be viewable in real time in order to facilitate use of the equipment. For this reason the processing circuit must be capable of completing the processing of all pixel patches and writing the processed pixels to the store without interfering with reading from the store to the monitor in a frame period of the monitor, at least when averaged over a few frame periods.

The above discussed systems each provide electronic means by which a user can create image data for display on a monitor and/or for subsequent printing.

The invention aims to provide an improved electronic graphic system in which there is a greater degree of control over the painting of an image and in the combining of two independent images based on a user definable and/or modifiable control image. To this end, a system embodying the invention includes means by which features in an image being modified can be expanded or contracted (hereinafter referred to simply as "positive grow" and "negative grow") under the control of the user. The invention has particular, but not exclusive, application to the positive and negative growth of a control image or stencil.

Thus, in one mode of operation of a system embodying the invention, once a control image has been created it can be positively grown in order that a greater contribution is made by the foreground image in the boundary between the foreground and background images. In another mode of operation of the system the control image can be negatively grown in order that a lesser contribution is made by the foreground image, and a correspondingly greater contribution is made by the background image, at the boundary between the images.

According to one aspect of the invention there is provided an electronic graphic system comprising: storing means for storing first data representing a first image processing means for creating second data from said first data such that the image represented thereby is substantially the same as said first image offset by a user determined distance and in a plurality of different predetermined directions and combining means for combining said first and second data to produce modified data.

According to another aspect of the invention there is provided a method of processing image data to produce modified image data, the method comprising the steps of: creating offset data from said image data, said offset data representing an image that is substantially the same as the image represented by said image data offset by a user determined distance in a predetermined direction; and combining the offset data and the image data to produce the modified image data.

According to a further aspect of the invention there is provided a method of softening edges in a previously created keying image, the method comprising storing data representing the keying image in a data store and repeatedly adding similar data representing respective offset versions of the keying image to the stored data in a user determined weighted summation.

According to an additional aspect of the invention there is provided a method of processing image data, the method comprising writing image data to a store such that the data is offset before being stored and as it is stored is combined with previously stored data in a user determined weighted summation, the writing of the image data being repeated for different offsets so as to produce modified data representing an image having soft edges.

Both positive and negative growth may be used to add soft edges to a stencil where no such edges previously existed. The invention can also be applied to the expanding or contracting of features in a picture. In the practice of the invention the user is able to determine both the offset distance and the weighting of the summation.

The above and further features of the invention together with advantages thereof will become clearer from consideration of the following detailed description of an exemplary embodiment of the invention given with reference to the accompanying drawings.

Figure 1:
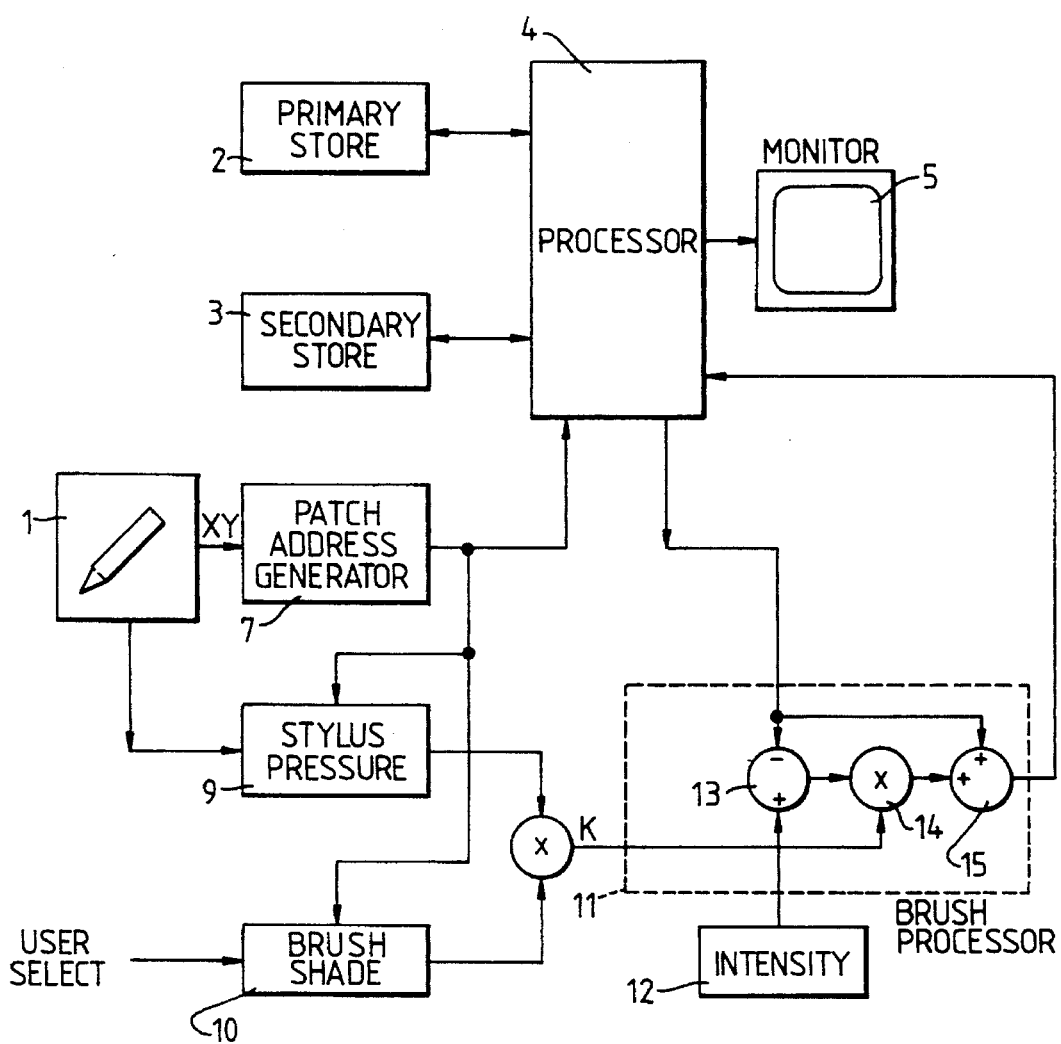
FIG. 1 is a schematic block diagram of a system embodying the invention.

Referring now to FIG. 1 of the accompanying drawings an electronic graphic system shown therein includes a stylus/touch tablet device 1 by which the artist may create an image in one of two framestores 2 or 3, say store 2, which is read by processor 4 and displayed on a monitor 5. As the stylus is drawn across the tablet by the artist a number of signals are output from the device. Signals XY representative of the instantaneous position of the stylus on the tablet are output to a patch address generator 7. The patch address generator 7 converts the XY co-ordinate information from the tablet into a corresponding location, i.e. picture point, address in the framestore 2.

Notional drawing implements are used to draw images into the framestore 2 and the system may be arranged such that after each update of the framestore incremental movements of the stylus over the touch tablet are integrated until they exceed one picture point or similar spacing and then the framestore is again updated by stamping a modified patch of pixels in the framestore 2. A signal representing the instantaneous pressure of the stylus on the touch tablet is also delivered to a stylus pressure register 9.

As in the systems described in our above mentioned patents, a set of artist selectable notional drawing implements are each stored in a brush shape memory 10 as a numerical representation of a continuous three dimensional shape which covers a patch of image pixels. The address signal output from the patch address generator 7 is also used to synchronise addressing of the stylus pressure register 9 and the brush shape memory 10. Selection means (not shown in FIG. 1) are provided to allow the artist to select one of the drawing implements from the set. The selection means for example may be a menu driven arrangement displayed on the monitor 5.

In normal use data output from the stylus pressure register 9 and the brush shape memory 10 as the artist moves the stylus across the touch tablet are multiplied together to produce a coefficient K for use by a brush processor circuit 11.

The brush processor circuit 11 performs a continuously cycling read-modify-write operation on the image data in the framestore 2 on a pixel-by-pixel basis. Image data is extracted from the framestore 2 and is negatively summed with, i.e. subtracted from, a preset image intensity value held in an intensity register 12 by a summing unit 13. The resulting sum output from the summing unit 13 is multiplied with the coefficient K by way of a multiplying unit 14 and the resulting product is then added to the data extracted from the framestore 2 by way of an adding unit 15. The data output from the adding unit is then written back into the framestore 2, replacing the original data therein.

Although the read-modify-write process is executed in a continuous cycle on the data held in the framestore, it should be apparent to those possessed of the appropriate skills that the data will only be modified when the artist is drawing on the touch tablet with the stylus. K is the product of brush shape and stylus pressure and when the artist is not using the stylus/touch tablet device under pressure the data in the framestore 3 will remain unaltered and no read-modify-write cycles are performed. This method of processing data drawn into the framestore 2 avoids the problem of jagged lines by producing non-stepped profiles at the boundary of the line or area drawn by the user.

The framestores 2 and 3 can be used to store colour image data representing two independent pictures and both can also be used to store respective control images or stencil for use in controlling the combining of the data representing the two pictures. The pictures and the control image may be drawn by the user or they may be input from an external source for modification by the system under user control.

During painting, each time one of the brush points moves over a pixel in the control image the value of the image pixel is recalculated by the brush processor and thus where only the edge of the brush shape moves over a particular image pixel the resulting value of K for the image pixel will be relatively low. Similarly where the centre of the brush moves over a pixel the resulting value of K in the image will be relatively high. Thus, when a control image is drawn by the user it will be free from jagged edges, in other words it will have "soft" edges. When the control image thus produced is used to control the combining of two pictures the effect of the soft edges will be to cause a gradual transition between the two foreground and background in the final combined image. Accordingly, the boundary between the two images, once combined, will be unnoticeable except under close inspection.

The same however cannot always be said of control images created outside the drawing system shown in FIG. 1. Keying images can be generated automatically by selecting a characteristic, say colour, in one of the images to be combined and identifying all points where that colour occurs as control points in a control image. Such control images may not have soft edges. The result of using a control image with hard edges is to produce a combined image with sudden changes at the boundary between the foreground and background images which changes are usually highly visible and can be unsightly.

Figure 2:
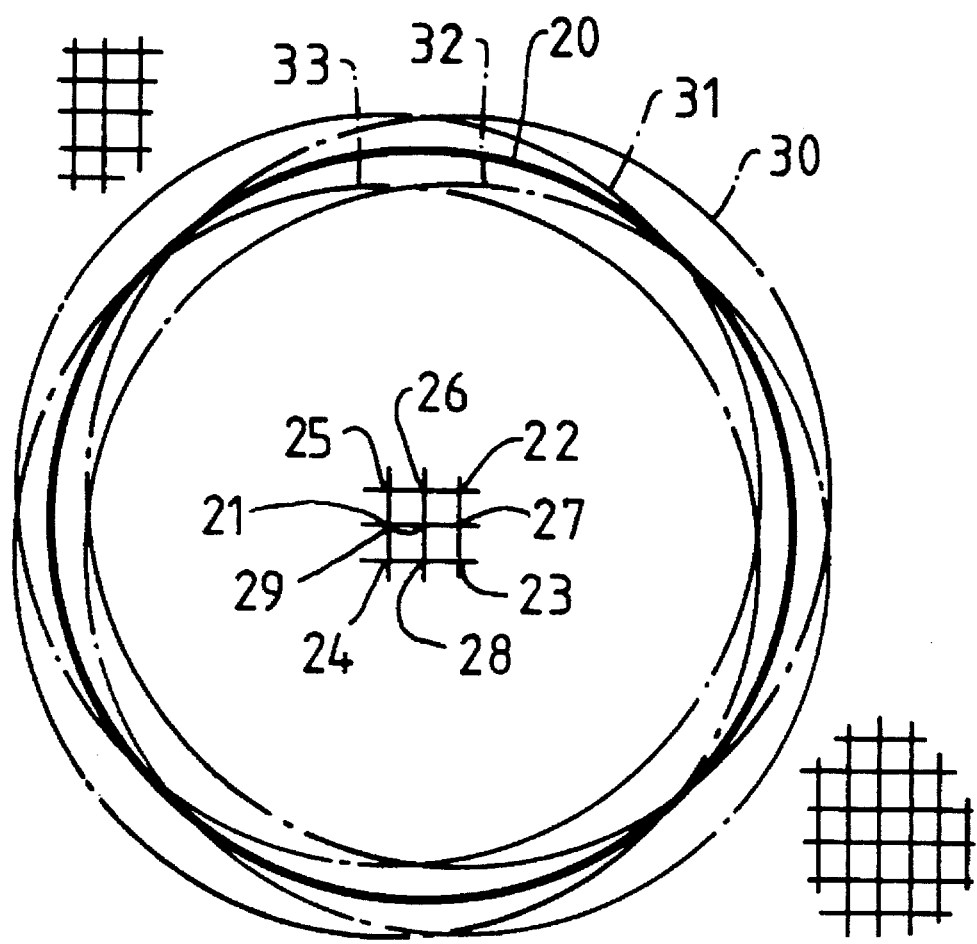
FIG. 2 shows how data is offset before being combined.

The system shown in FIG. 1 includes a menu selectable function by which boundaries in the control image can be made to expand positively or contract negatively with soft edges. An example of the operation of the positive grow function is shown in FIG. 2 of the accompanying drawings. For the sake of simplicity, the control image is assumed to be a circle 20 having a central pixel 21. The data representing the control image is stored in, say, store 2 and on selection of the grow function is copied into the other store 3. As the data is copied into the other store 3 it is offset by a predetermined distance in a predetermined direction. Thus, for example the data may be offset by one pixel to the right and one pixel up (as shown in the drawing) so that the centre of the circle is at pixel 22 in FIG. 2. With this offset in place the thus modified control image data ($I_m$) is combined by the processor 4 with the original control image data ($I_c$) to produce new control image data ($I_n$) in accordance with the weighted summation defined by the equation:

$$I_n = (1-p)I_c + pI_m \qquad (A)$$

Where p is a constant between 0 and 1, for example 0.2. The new control data is written back to the store 2 replacing the data previously there and the modified data in store 3 is again offset so that the centre of the circle is at pixel 23 in FIG. 2. The data in the two stores is then combined again in accordance with equation (A) and written back to the store 2.

The above described procedure is repeated for offsets corresponding to the centre of the control image positioned at each of the pixels 22 to 29 shown in FIG. 2. For the sake of clarity, only the shifted boundary lines 30 to 33 corresponding to centres 22 to 25 are shown but it will be appreciated that overall the effect of this procedure is to expand the area covered by the stencil by adding a band of pixels around the outside of the boundary thereof. Pixels in the added band have a lower value than pixels at the original stencil and thus a soft edge is added to the stencil boundary.

It will be appreciated that although the above description refers to a single offset of one pixel in each direction the system is not so limited. The system may be arranged to offset the image by several pixels in each of several different direction or to execute several different offsets in each of several different directions with different values of p in the weighted summation defined by equation A for each offset.

The system is arranged to display a menu of functions by name on the monitor 5, including the above described positive grow function, which names enable a function to be selected by a user of the system. When the positive grow function is selected the menu displays a box containing a number comprising an integer part and a fraction part. The number is set by the user, and the system interprets the integer part as the offset in pixels and the fraction part as the weighting constant p in the weighted summation defined by equation A. Thus, for example, the number 2.34 would be interpreted as an offset of two pixels and a weighting constant of p=0.34. Any suitable method of data entry may be used to select the offset and weighting values and indeed they may be input as entirely separate numbers if required.

When negative grow is selected, exactly the same procedure is performed but the control image data is first inverted. Assuming that the control image data has a value between 0 and 1, which indeed it does, then it can be inverted in accordance with the equation:

$$I_c(inv)=1-I_c \quad (B)$$

where $I_c(inv)$ is the inverted value of the control image data. $I_c(inv)$ is then applied to the weighted summation defined by equation (A) in place of $I_c$.

The effect of applying equation (A) is again to create a band of lower value pixels at the boundary of the original stencil, but in this case the band is created by expanding the area outside the boundary, i.e. contracting the area inside the boundary, so that in effect, a smaller stencil with soft edges is created.

The system is not limited only to expanding or contracting a stencil and may also be applied to expanding or contracting a feature or features in a picture. For example in say a picture taken at night the positive grow function could be used to enhance stars in the night sky and the negative grow function might be used to reduce the contribution made to the picture by street lights.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

I claim:

1. An electronic graphic system for effecting displacement of a boundary of an image feature, the system comprising:
   a first store for storing data representing an image;
   a second store for storing data representing an image; and
   a processor for: deriving, from data in an area of said first store, data representing at least a portion of the image represented by data stored in the first store offset in a predetermined direction by a user determined distance;
   storing the derived data in the second store; and
   repeatedly combining the data from the second store and the data in said area of the first store to create combined data, storing the combined data in said area of the first store, and offsetting the data in the second store such that the offset data represents the image portion at a position different than that of each offset image portion previously stored in the second store,
   whereby the data in said area of the first store is modified so as to represent said portion as having a displaced image feature boundary.

2. An electronic graphic system as claimed in claim 1, wherein said processor combines said data from said first store and said data from said second store as a weighted summation in accordance with a user determined weighting constant.

3. An electronic graphic system as claimed in claim 2 wherein said processor combines said data from said first store and said data from said second store in accordance with the equation In=(1-p)Ic+pIm, where In is said combined data, Ic is said data from said first store, $I_m$ is said data from said second store, and p is said user determined weighting constant, and said modified data in the first store represents an image including at least a portion having an image feature that has been expanded in size by said boundary displacement.

4. An electronic graphic system as claimed in claim 2, wherein said processor creates inverted data from said data from said first store in accordance with the equation Icp(inv)=1-Ic, where Ic is said data from said first store and Ic(inv) is said inverted data, and combines said inverted data and said data from said second store in accordance with the equation In=(1-p)Ic(inv)+pIm, where In is said combined data, Im is said data from said second store and p is said user determined weighting constant, and wherein said modified data in said first store represents an image including at least a portion having an image feature that has been reduced in size by said boundary displacement.

5. An electronic graphic system as claimed in claim 2, wherein said data in said first store represents a control image.

6. An electronic graphic system as claimed in claim 5, wherein said control image has soft edges.

7. An electronic graphic system as claimed in claim 2, wherein the system further comprises a user operable input device for inputting data representing a number comprising an integer part and a fraction part, and the processor interprets said integer part as said user determined distance and said fraction part as said user determined weighting constant.

8. An electronic graphic system as claimed in claim 1, wherein said data in said first store represents a picture.

9. An electronic graphic system as claimed in claim 1, wherein said system further comprises a monitor and said monitor displays the image represented by the data stored in said first store.

10. A method of processing image data for effecting displacement of a boundary of an image feature to produce modified image data, the method comprising the steps of:

storing data representing an image in a first store;

deriving, from data in an area of said first store, data representing at least a portion of the image represented by data stored in the first store offset in a predetermined direction and by a predetermined distance;

storing the derived data in a second store; and repeatedly combining the data from the second store and the data in said area of the first store so as to form combined data, storing the combined data in said area of the first store so as to replace the data previously stored therein, and offsetting the data in the second store such that the offset data represents the image portion at a different position than that of an offset image portion previously stored in the second store, whereby the data in said area of the first store is modified so as to represent said portion as having a displaced image feature boundary.

11. A method as claimed in claim 10, further comprising combining said data from said first store and said data from said second store as a weighted summation in accordance with a predetermined weighting constant.

12. A method as claimed in claim 11, further comprising the step of combining said data from said first store and said data from said second store in accordance with the equation $In=(1-p)Ic+pIm$, where In is said combined data, Ic is said data from said first store, Im is said data from said second store, and p is said user determined weighting constant, whereby said modified data in the first store represents an image including at least a portion having an image feature that has been expanded in size by said boundary displacement.

13. A method as claimed in claim 11, further comprising the steps of creating inverted data from said data from said first store in accordance with the equation $Ic(inv)=1-Ic$, where Ic is said data from said first store and Ic(inv) is said inverted data, and combining said inverted data and said data from said second store in accordance with the equation $In=(1-p)Ic(inv)+pIm$, where In is said combined data, Im is said data from said second store and p is said user determined weighting constant, whereby said modified data in said first store represents an image including at least a portion having an image feature that has been reduced in size by said boundary displacement.

14. A method as claimed in claim 11, wherein said data in said first store represents a control image.

15. A method as claimed in claim 14, wherein said control image has soft edges.

16. A method as claimed in claim 10, wherein said data in said first store represents a control image having soft edges.

17. A method as claimed in claim 10, further comprising the step of outputting said data from said first store and displaying the image represented by said data from said first store on a monitor.

* * * * *